United States Patent [19]

Mathias et al.

[11] Patent Number: 5,446,897
[45] Date of Patent: Aug. 29, 1995

[54] AUTOMATED ADDRESS DISCOVERY METHOD AND APPARATUS FOR LOCAL AREA NETWORKS

[75] Inventors: Thomas B. Mathias, Vestal; Richard J. Planutis, Endicott; Judith A. Wierbowski, Owego, all of N.Y.

[73] Assignee: International Business Machines Corporation, Armonk, N.Y.

[21] Appl. No.: 575,579

[22] Filed: Aug. 31, 1990

[51] Int. Cl.$^6$ ............................................. G06F 13/14
[52] U.S. Cl. ................................ 395/700; 395/200.01; 364/284.4; 364/242.95; 364/280.2; 364/940.62; 364/DIG. 1
[58] Field of Search .................. 364/DIG. 1, DIG. 2; 395/200

[56] References Cited

U.S. PATENT DOCUMENTS

| | | | |
|---|---|---|---|
| 3,787,627 | 1/1974 | Abramson et al. | 179/15. |
| 4,468,738 | 8/1984 | Hansen et al. | 364/200 |
| 4,644,468 | 2/1987 | Doster et al. | 364/200 |
| 4,750,136 | 6/1988 | Arpin et al. | 364/514 |
| 4,827,411 | 5/1989 | Arrowood et al. | 364/300 |
| 4,873,521 | 10/1989 | Dietrich et al. | 340/825.52 |
| 4,942,540 | 7/1990 | Black et al. | 364/514 |
| 4,992,976 | 2/1991 | Yonekura et al. | 364/900 |
| 5,038,320 | 8/1991 | Heath et al. | 364/900 |

FOREIGN PATENT DOCUMENTS 2337478 12/1975 France .
2216365 10/1989 United Kingdom .

OTHER PUBLICATIONS

W. M. Loucks, W. I. Kwak and Z. G. Vranesic, "Implementation of Dynamic Address Assignment Protocol in a Local Area Network", 8213 Computer Networks and ISDN Systems 11 (1986) Feb., No., 2, Amsterdam, Netherlands, pp. 133–145.

Primary Examiner—Kevin A. Kriess
Assistant Examiner—L. Toplu
Attorney, Agent, or Firm—Pollack, Vande Sande & Priddy

[57] ABSTRACT

A method and apparatus for automatically associating physical network addresses with logical identifiers in local area networks. The physical network address is transmitted to a central administrator of the local area network, where the association between such address and a logical identifier is made. In the case where a new device is being installed on the network, the logical identifier may be an arbitrary word, number, or combination thereof which is supplied by the operator at the central administrator. In the situation where a device is being replaced, the logical identifier is the same as the identifier of the replaced device, while the physical network address of the replacement device is substituted in the association for the address of the replaced device. A compilation of the associations is maintained at the central administrator, and the associations are transmitted back to the devices being installed or replaced, as well as other devices on the network. A removal procedure is also utilized, whereby a selected association(s) may be removed from the system.

12 Claims, 6 Drawing Sheets

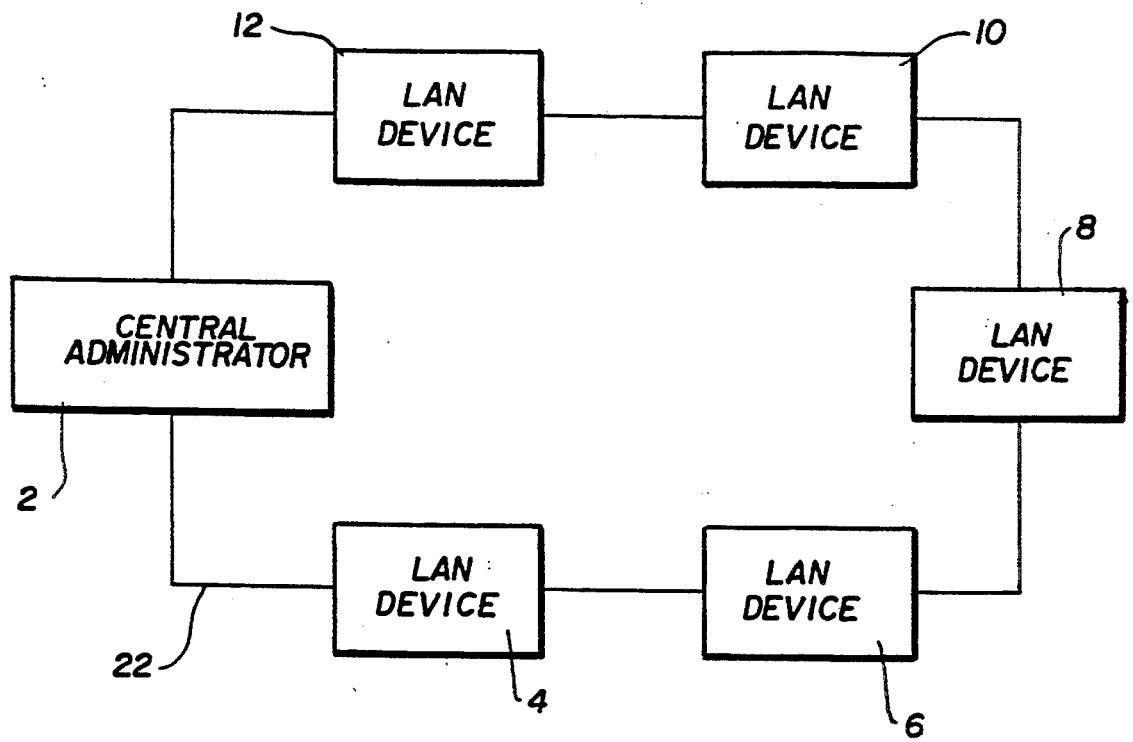
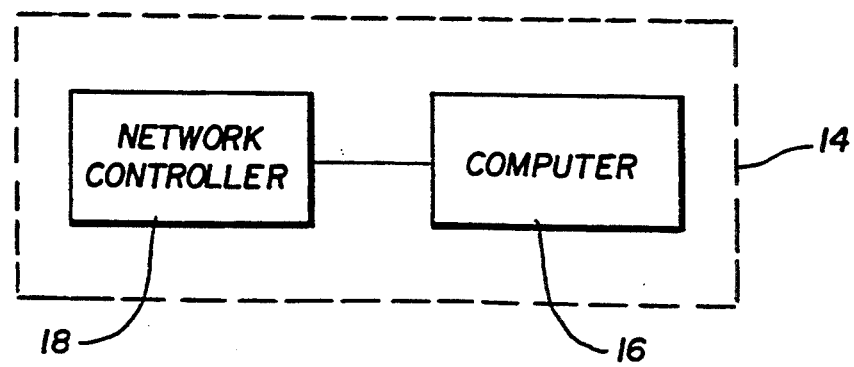

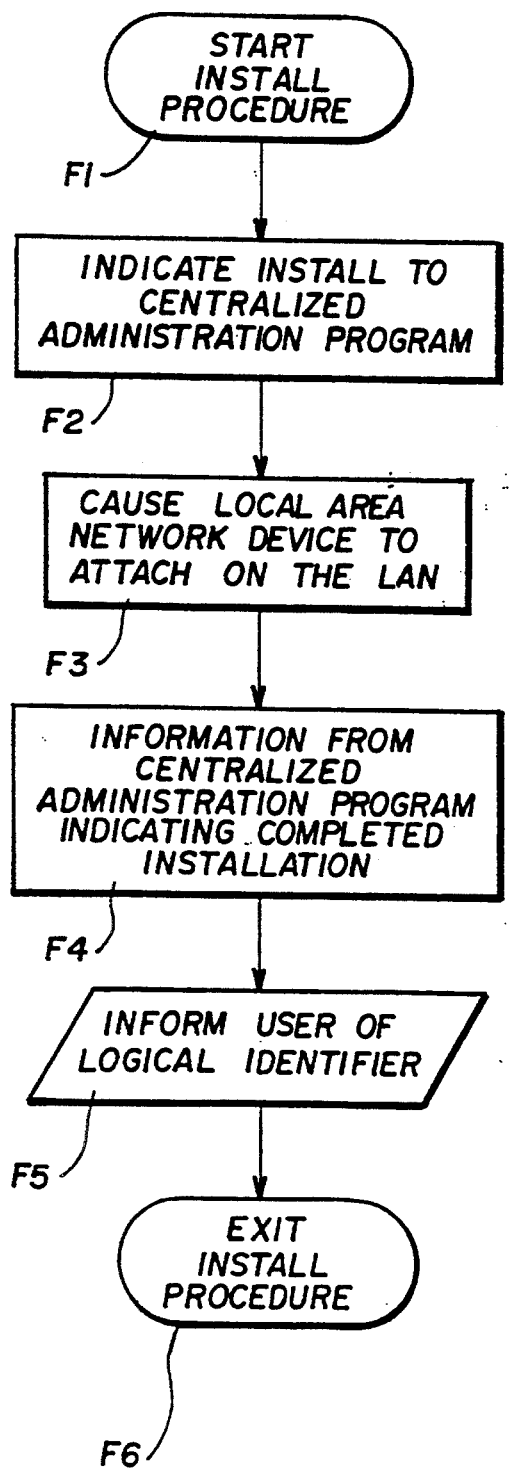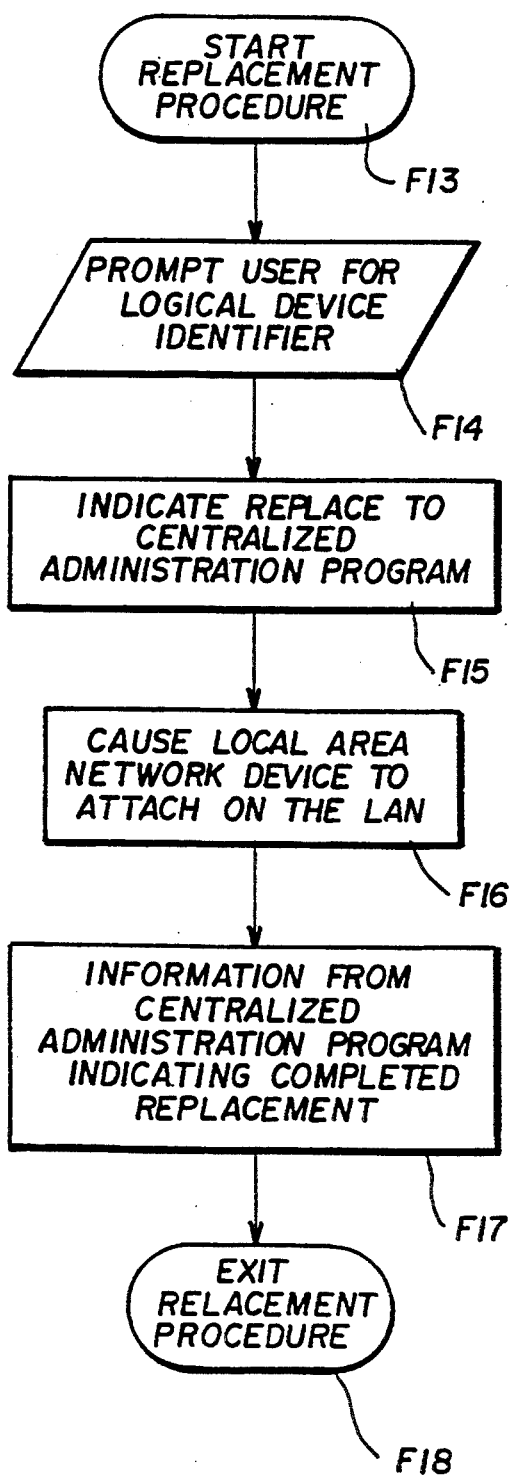

AUTOMATED ADDRESS DISCOVERY METHOD AND APPARATUS FOR LOCAL AREA NETWORKS

DESCRIPTION

1. Technical Field

The present invention is directed to improvements in local area networks, and particularly to a method and apparatus for automatically associating physical network addresses with logical identifiers in such networks.

2. Background of the Invention

As is known, a local area network may be comprised of a number of intelligent devices which are connected together so as to enable communication between the devices or some subset thereof. For example, such communication may be in accordance with one of the established networking protocols such as token ring, Ethernet, FDDI, or some combination thereof.

To effect communication, each intelligent device must have a unique physical network address by which it is addressed on the local area network. Typically, such addresses are many characters in length, and are programmed in a PROM, which is affixed in the intelligent device. However, when the operator of one device wishes to communicate with another device, it is inconvenient to have to key in the physical network address of the destination device. This is because such address would typically be a long string of alphanumeric characters which would be difficult to remember, and which could therefore easily lead to keying errors. It is much more desirable to be able to key in a recognizable name or number by which the destination device is known, e.g., "JOE", "34", or "MARY SERVER #11".

This name or number by which the devices are known is hereinafter called the logical identifier, and in order for the operator to be able to use such a method of addressing, there must be an association between the physical network address of each device on the network and the logical identifier which corresponds to that address. In this way, when the logical identifier is keyed in by the operator, the lower levels of the system may be arranged to automatically send out a signal on the network which corresponds to the associated physical network address, so that the device which has such address may be addressed.

In the prior art, to make this association each time a new intelligent device was installed or replaced on the network, it was necessary for an operator at such device to manually key in the physical network address, the logical identifier, or both. This was an inconvenient, time consuming and error prone operation. Additionally, it was not even possible to do in cases where the intelligent device did not have a display means. This is because the physical network address, which is typically stored in a PROM in the device, is undiscoverable without a special program for reading the address out to a display. If the intelligent device lacks a display, the address is not obtainable by a human.

The problems associated with the manual inputting of the data related to the physical network address/logical identifier association are what led to the making of the present invention.

SUMMARY OF THE INVENTION

It is thus an object of the present invention to obviate the problems associated with the manual inputting of data related to the physical address/logical identifier association in a local area network.

It is a further object of the invention to provide for the automatic association of the physical network address and logical identifier in a local area network.

In accordance with the invention, the above objects are accomplished in a local area network which includes a central administrator device and a number of local devices which are enabled to communicate with each other. To automatically effect the desired association when a device is being installed or replaced, the physical network address of the device is transmitted to the central administrator. At the central administrator, the logical identifier for the device is made available, and is associated with the physical network address. A compilation of such associations is maintained in a table or database at the central administrator, and the new association is transmitted back to the device being installed or replaced. Additionally, the new association or the complete compilation of associations as updated may be transmitted to the other local devices on the network or some subset thereof.

In the case where a device is being installed, the logical identifier is an arbitrary word, number, or combination thereof which may be provided by the operator at the central administrator. In the situation where a device is being replaced, the logical identifier is the same as that of the replaced device, and the address of the replacement device is substituted in the association for the address of the replaced device.

When a device is removed from the network, both the logical identifier and the physical network address of the device are removed from the compilation of associations.

BRIEF DESCRIPTION OF THE DRAWINGS

The present invention will be better understood by referring to the accompanying drawings wherein:

FIG. 1 is a schematic representation of a local area network.

FIG. 3 is a more detailed representation of a possible local area network device.

FIG. 4 is a flow chart for the procedure for installing a local area network device.

FIG. 5 is a flow chart for the procedure for replacing a local area network device.

DESCRIPTION OF ILLUSTRATIVE EMBODIMENT

Referring to FIG. 1, an elementary local area network is depicted. It is seen to be comprised of a plurality of local area network (LAN) devices of arbitrary number, one of which may serve as a central administrator.

Thus, in the elementary network depicted in FIG. 1, central administrator 2 is connected to local area network devices 4, 6, 8, 10 and 12 in such manner as to enable communication between the devices or some subset thereof. For example, in the simplest arrangement, communication only between each local area network device and the central administrator might be possible, while in more sophisticated implementations, it would be possible for all of the local area network devices to communicate with each other. Such communication could be any of the known networking protocols such as token ring, Ethernet, FDDI, or some combination thereof.

The local area network devices themselves could be any type of intelligent device, for example computers, work stations, processor controlled printers, microprocessors, etc. The only requirements are that the local area network devices be intelligent, and that they be able to communicate on the network; while this would normally call for software controlled devices, even hardware controlled devices could be used, if intelligent.

Figure 2:
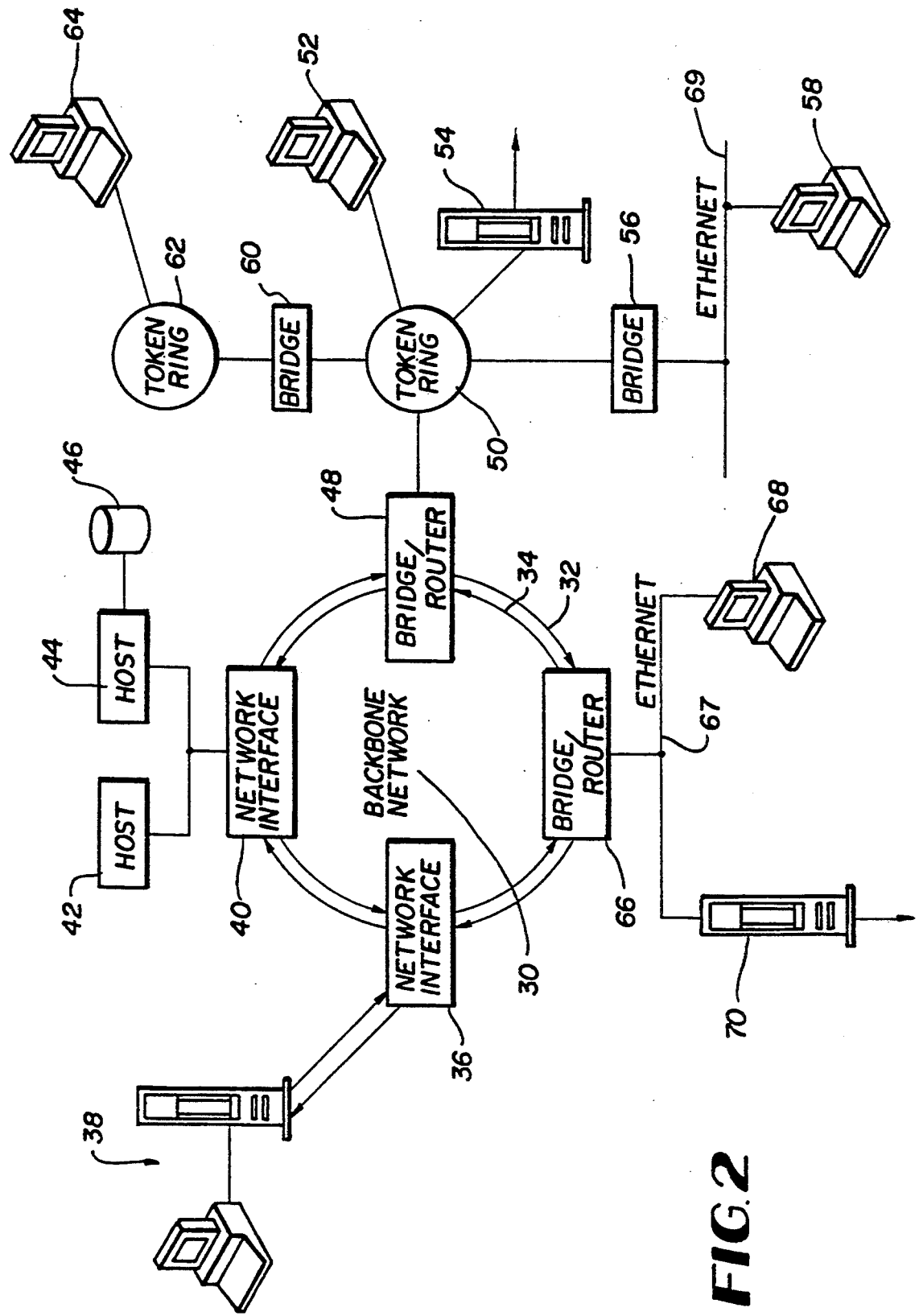
FIG. 2 is a representation of an embodiment of an actual local area network.

FIG. 2 is an example of an actual local area network, which illustrates the different devices and networking protocols which may be used. The network is comprised of backbone 30 around which may be disposed sub-networks, such as subnetworks 50 and 67. In the specific example shown in FIG. 2, backbone network 30 is implemented in FDDI protocol, and is seen to have light fibers 32 and 34. A variety of different specific local area network devices may be connected on the network, and in FIG. 2 network interface 36 is seen to connect high performance workstation 38 to the backbone network, while network interface 40 connects host computer 42, and host computer 42/server 46. Bridge/router 48 is for interfacing devices which operate on different protocols, and is used to interface token ring 50 to the FDDI backbone. Token ring 50 has devices including workstation 52 and gateway 54 thereon, the gateway enabling interfacing of other devices over the telephone lines. Bridge 60 connects token ring 62, which is seen to include workstation 64, while bridge 56 connects workstation 58, which is on Ethernet bus 69. Finally, bridge/router 66 interfaces workstation 68 and server 70 to the backbone, which devices communicate via Ethernet bus 67.

FIG. 3 illustrates a typical local area network device 14 in greater detail, which is seen to be comprised of computer 16 and network controller 18. Network controller 18 contains the software and hardware which is necessary to mate computer 16 to the network protocol being used, for example, token ring, to enable the computer to communicate on the ring.

As discussed above, each local area network device has a unique physical network address by which it is addressed on the network. This address is typically a long alphanumeric string, which is burned into a PROM, which could be located in a local area network card which is affixed to the device. To help ensure that more than one device does not have the same address, blocks of addresses may be assigned by a central authority.

To send a message to a local area network device, its physical network address must be transmitted on the network lines. However, as discussed above, instead of entering the physical network address, the operator of a transmitting device would enter the logical identifier which is associated with such address. This can be an easy to remember name, number, or combination thereof, for example, "JOE", "31", or "MARY SERVER 11". When the logical identifier is keyed in, the lower levels of the system are arranged to make the association, and cause the correct physical network address to be transmitted on the network.

In the prior art, when a new local area network device was installed on the network, or when a local area network device was replaced, it was typically necessary for an operator to have to key in the physical network address, the logical identifier, or both at the new local area network device. This was an inconvenient, time consuming and error prone operation. Additionally, as discussed above, it was not even possible to accomplish when the local area network device did not have a display means, as the address would be undiscoverable by a human.

The present invention obviates the need for entering information relating to the physical network address/logical identifier at the local device. Thus, in accordance with the procedure of the invention, the local area network device is physically connected, communicates its address to the central administrator, and the association of physical network address to logical identifier is automatically made at the central administrator, whereupon the association is communicated back to the local device.

Referring to FIG. 4, a flow chart is shown for the procedure to install a new local area network device. Thus, after the local area network device is physically connected to the network, the install procedure is started (function F1). In accordance with function F2, the program at the central administrator is told to prepare for an install operation, as by an operator keying in such information at the central administrator. Then, in accordance with function F3, the local area network device is caused to attach on the local area network for the first time.

Figure 6:
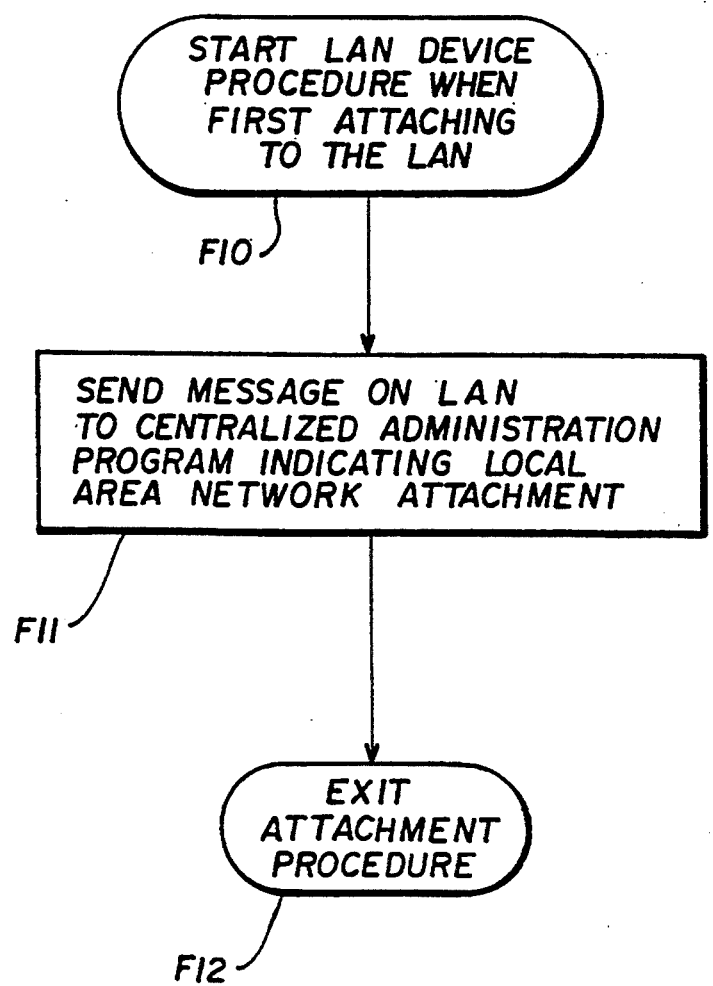
FIG. 6 is a flow chart depicting a procedure by which devices attach to the local area network.

The procedure for attachment is shown in FIG. 6. In the present context, attachment denotes the enablement of the local area network device to communicate on the local area network in accordance with the desired protocol. Thus, referring to the flow chart of FIG. 6, the procedure for attachment is started at the local area network device (function F10), upon attachment, a message is sent to the central administrator (function F11), and exit is made from the procedure (function F12).

As part of attachment, the local area network device will send out a "find" frame to the central administrator. It is essential that the find frame include the address of the new local area network device, and it may optionally include other information including the connection class which the local area network device can support and the frame length that it can handle. The central administrator will in turn send a "found" frame to the local area network device, which will include the address of the local area network device, as well as possibly the optional information such as the connection class which the central administrator will support, the frame length which it can handle, etc. and there may be negotiations between the central administrator and the local area network device on such matters.

Figure 7:
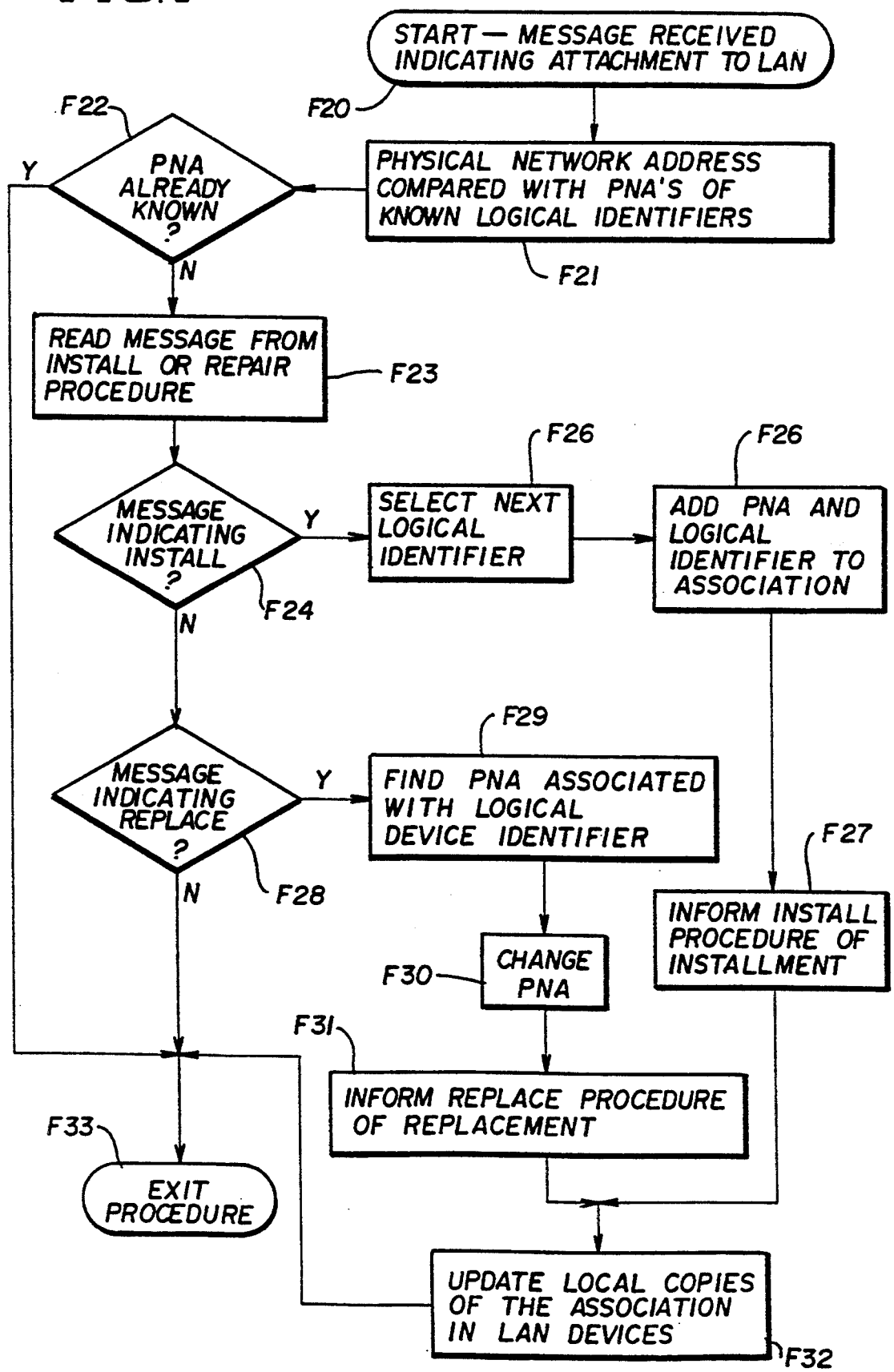
FIG. 7 is a flow chart for the procedure at the central administrator when a message is received from a local area network device indicating its first attachment to the network.

Now that attachment has been attained, reference is made to FIG. 7, to illustrate the procedure which is followed by the lower levels of the central administrator in accordance with the central administration program after a local area network device first attaches on the network, assuming that an instruction to prepare for an install has been inputted to the central administrator.

In FIG. 7, function F20 denotes the start of the procedure upon receipt of a message that attachment has occurred. The central administrator maintains a compilation of the physical network address/logical identifier associations of the local area network devices in the local area network, and in accordance with function F21, the new physical network address is compared with the physical network addresses of known logical identifiers in the compilation of associations.

The compilation of association may be maintained as a simple lookup table which is implemented in software. In this case, the table or a part thereof would need to be communicated to other local area network devices to provide them with enough information to enable them to communicate on the network as necessary. In the alternative, the association may be in the form of a database, and in such case, by the use of available programs, the associations could be kept only at the central administrator, while the local area network devices could obtain information as needed by appropriate queries.

In accordance with decision block function F22, if the physical network address is already known at the central administrator, the procedure is exited at function F33. If the physical network address is not already known, then the message which was keyed in by the operator as to whether the procedure is an "Install" or a "Replace" is read at decision block functions F24 and F28. Assuming an Install, then the program proceeds to function F25 to select the logical identifier. The logical identifier may typically be inputted by the operator at the time that the central administrator is told to prepare for an install. Thus, the operator, for example, might know that the local area network device to be known as MARY SERVER #11 is being installed, and thus would key this in at the beginning of the procedure.

In the alternative, the program at the central administrator could be arranged to automatically assign the next logical identifier in a sequence of such logical identifiers to be assigned. In accordance with function F26, the new association is added to the compilation of associations which is maintained by the central administrator, and as per function F27, the install procedure is informed that an installation has been made. Referring back to FIG. 4, this results in an indication to the operator at the central administrator that the installation has been completed (function F4). Then, in accordance with function F5, the operator at the central administrator is informed of the logical identifier in the case where this designation is automatically assigned. Of course in the case where the logical identifier had been originally entered by the operator, it would already be known to her, and step F5 would be unnecessary. At function F6, the install procedure is exited.

Now, the device being installed must be informed of its logical identifier, and this is accomplished at function F32 in FIG. 7. This can be done just after the association is made, or in the case where the local area network devices are extremely simple and have no stored program other than that which enables them to get on the network, may be done later, i.e., at the same time that the central administrator loads the local area network devices with microcode to enable their operation on the network.

Referring to Function F32, at the time that the local area network device which is being installed is informed of its logical identifier, it may also be informed of the associations corresponding to the other local area network devices on the network which are maintained by the central administrator. Additionally, a procedure must be implemented to inform the other local area network devices on the network of the association corresponding to the newly installed device, and this is also depicted by function F32. There are several ways to accomplish this, one option being to send a complete copy of all associations to all local area network devices each time a change is made. A further option is to send only the updated information to all local area network devices, and a still further option is to send only the updated information to only those local area network devices which are affected. This requires the central administrator to keep a record of which local area network devices are communicating with each other to be able to make the proper distribution of information.

Finally, another approach to informing local area network devices on the network is to send a message to all local area network devices indicating that a change has been made. It would then be up to the individual local area network device to request information relating to the nature of the change.

The flow chart shown in FIG. 5 is for replacing a local area network device. This procedure would become necessary if a LAN card, which stores the physical network address, becomes inoperative, in which case a new LAN card bearing a different physical network address would be substituted. Additionally, when equipment is upgraded, the new equipment would have a new LAN card, but it would be desirable to keep the same logical identifier.

The procedure for a replacement is similar to the procedure for an Install. Thus, referring to FIG. 5, the procedure is started at function F13. In accordance with function F14, the operator at the central administrator is prompted to key in the logical identifier of the local area network device which is being replaced. The operator then instructs the central administration program to prepare for a replacement (function F15), and the new local area network device having the new physical network address is caused to attach on the network in function F16 (FIG. 6).

Then, referring again to FIG. 7, and specifically to decision block function F28, a replacement is indicated. At function F29, the physical network address which corresponds to the logical identifier which had been entered is found, and in accordance with function F30, the original physical network address is replaced with the new one. The new information is then communicated to the replaced device as well as to other devices on the network as previously discussed in accordance with function F32.

Figure 8:
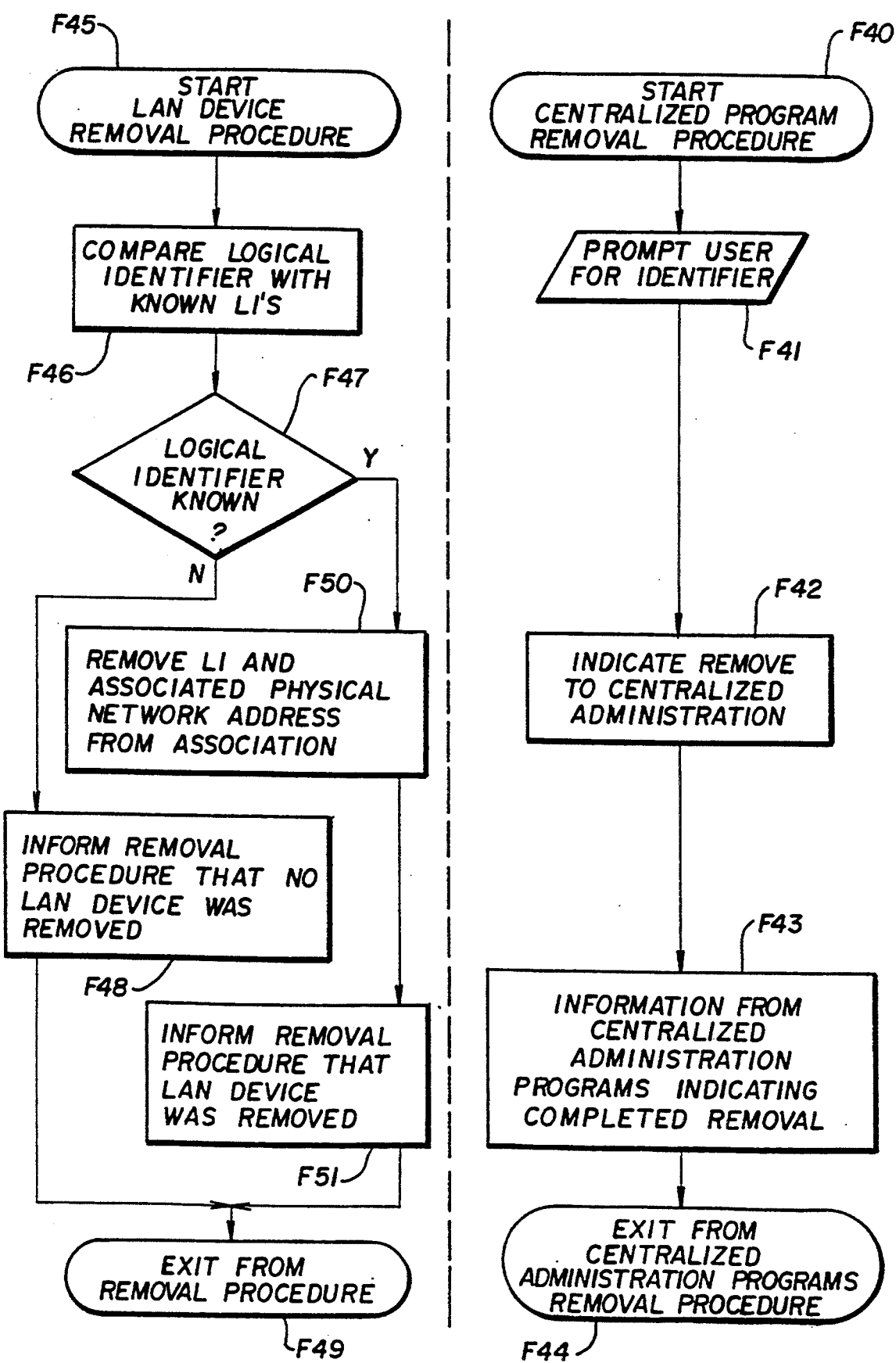
FIG. 8 is a flow chart for the procedure to remove a local area network device.

In accordance with a further aspect of the invention, a local area network device may be removed from the network. Referring to FIG. 8, the procedure is first started at the central administrator (function F40). After the start step, the operator is prompted to key in the logical identifier of the device being removed, (function F41), and then the operator informs the centralized administration program to perform a remove operation (function F42). In FIG. 8, the functions to the right of the dotted line are those relating to the operator-central administrator interface, while the functions to the left of the dotted line are those which take place at the lower levels of the system in accordance with the centralized administration program. Thus, performance of function F42 also causes the centralized administration program relating to replacement to start (function F45).

At function F46 and decision block function F47, the logical identifier which was inputted is compared with those logical identifiers which are known by the system. If the inputted logical identifier is not known, then the procedure is informed at function F48 that no such device is known, and the procedure is exited at function F49.

On the other hand, if the logical identifier is known, then both the logical identifier and its associated physical network address are removed from the compilation of such associations which is maintained at the central administrator at function F50, and the removal procedure is informed that removal has been effected at function F51, whereupon procedure is exited at function F49. The performance of an exit from the procedure causes an indication to the operator that the removal is complete (function F43), whereupon the procedure at the operator-central administrator interface is exited (function F44). Additionally, the other local area network devices on the network may be informed of the removal as necessary.

Thus, a procedure has been described for automatically accomplishing the associations of physical network associations with logical identifiers in local area networks, thereby obviating the problems which were caused by having to make such associations manually. It should be appreciated that while the invention has been disclosed in connection with illustrative embodiments, it is to be limited only by the claims appended hereto and equivalents.

What is claimed is:

1. In a local area network comprised of a plurality of intelligent devices and a central administrator, wherein each intelligent device has a physical network address stored therein, a method comprising the steps of, transmitting the physical network address of a device from the device to the central administrator, receiving the physical network address of the device at the central administrator, associating the physical network address of the device with a logical identifier at the central administrator, transmitting the logical identifier back to the device, and maintaining a compilation of associations between physical network addresses and logical identifiers for intelligent devices of the local area network at the central administrator.

2. The method of claim 1 wherein the device for which the association is made is being installed on the network, and the logical identifier is a new logical identifier which was not previously used in the local area network.

3. The method of claim 1 wherein the device for which the association is made is a replacement device for a device which is being replaced, and the logical identifier is identical to the logical identifier of the device which is being replaced.

4. The method of claim 3 wherein the physical network address of the device which is being replaced is replaced with the physical network address of the replacement device at the central administrator.

5. The method of claim 1 wherein the logical identifier is inputted by an operator to the central administrator.

6. The method of claim 1 wherein the logical identifier is originated internally at the central administrator.

7. The method of claim 1 wherein the compilation of associations or a subset thereof is transmitted to the device.

8. The method of claim 7 wherein the compilation of associations or some subset thereof is transmitted to other devices of the local area network.

9. The method of claim 1 wherein when a device is removed from the local area network, its logical identifier and associated physical network address are removed from the compilation of associations which is maintained at the central administrator.

10. In a local area network comprised of a plurality of intelligent devices and a central administrator wherein each intelligent device has a physical network address stored therein, apparatus comprising, means for transmitting the physical network address of a device from the device to the central administrator, means for receiving the physical network address of the device at the central administrator, means for associating the physical network address of the device with a logical identifier at the central administrator, means for transmitting the logical identifier back to the device, and means for maintaining a compilation of associations between physical network addresses and logical identifiers for intelligent devices of the local area network at the central administrator.

11. The apparatus of claim 10 wherein the device for which the association is made is being installed on the network, and the logical identifier is a new logical identifier which was not previously used in the local area network.

12. The apparatus of claim 10 wherein the device for which the association is made is a replacement device, and the logical identifier is the same as the logical identifier of the device which is being replaced.

* * * * *